United States Patent
Patel

(10) Patent No.: US 8,797,441 B2
(45) Date of Patent: Aug. 5, 2014

(54) CONTINUOUS ILLUMINATION OF BACKLIT DISPLAY AND OF SUBJECT FOR IMAGE CAPTURE

(75) Inventor: Parin Patel, Walnut Creek, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 12/363,619

(22) Filed: Jan. 30, 2009

(65) Prior Publication Data

US 2010/0194961 A1 Aug. 5, 2010

(51) Int. Cl.
*H04N 5/222* (2006.01)
*H04N 5/225* (2006.01)

(52) U.S. Cl.
USPC .................................. 348/333.01; 348/370

(58) Field of Classification Search
USPC ............................................ 348/370
See application file for complete search history.

(56) References Cited

U.S. PATENT DOCUMENTS

| | | | |
|---|---|---|---|
| 7,015,968 B2 * | 3/2006 | Ong et al. | 348/370 |
| 2004/0169769 A1 * | 9/2004 | Tatamiya | 348/370 |
| 2005/0068457 A1 * | 3/2005 | Yamamoto et al. | 348/370 |
| 2005/0212824 A1 * | 9/2005 | Marcinkiewicz et al. | 345/690 |
| 2008/0117323 A1 * | 5/2008 | Sakamoto et al. | 348/333.01 |
| 2008/0122821 A1 * | 5/2008 | Nilsson et al. | 345/207 |
| 2008/0224988 A1 | 9/2008 | Whang | |
| 2008/0307307 A1 | 12/2008 | Ciudad et al. | |
| 2009/0115880 A1 * | 5/2009 | Wada et al. | 348/333.01 |
| 2009/0273661 A1 * | 11/2009 | Mauchly | 348/14.08 |
| 2010/0020227 A1 * | 1/2010 | Robinson et al. | 348/371 |

\* cited by examiner

*Primary Examiner* — Albert Cutler
(74) *Attorney, Agent, or Firm* — David C. Kellogg

(57) ABSTRACT

A device to capture an image includes a camera oriented to capture a first image of a subject and a display oriented to display a second image that is viewable by the subject. A backlight is coupled to the display to provide light that passes through the display toward the subject. An image processor is coupled to the camera and the backlight to adjust an amount of light provided by the backlight responsive to a quality of the first image. The light provided by the backlight may illuminate the subject and thereby improve the quality of the first image. The image processor may further adjust the amount of light provided by the backlight responsive to an ambient light level sensed by an ambient light sensor. The image processor may further adjust the second image to adjust an amount of light that passes through the display.

3 Claims, 2 Drawing Sheets

CONTINUOUS ILLUMINATION OF BACKLIT DISPLAY AND OF SUBJECT FOR IMAGE CAPTURE

BACKGROUND

1. Field

Embodiments of the invention relate to the field of digital imaging; and more specifically, to subject illumination for capturing images.

2. Background

Cameras capture images by recording the light reflected from a subject. It is necessary for the subject to be adequately illuminated so that a sufficient amount of light is reflected into the camera for recording.

A camera may use an electronic image sensor to record images. Electronic image sensors may produce an "image" even when no light falls on the sensor. This "image" represents noise produced by the sensor. There may be other forms of noise produced by the sensor as well. It is desirable that the image produced by the subject produce signals that are substantially greater than the noise signals produced by the sensor.

Increasing the amount of light reflected onto the image sensor by increasing the amount of light illuminating the subject may improve the ratio of signal produced by the subject image to signal produced as noise, the signal to noise ratio (SNR), thus improving the quality of the captured image.

Still cameras may employ flash lighting where an extremely bright light of short duration illuminates the subject at the moment the subject image is captured. Cameras that capture a rapid succession of images to provide a moving picture, such as video cameras, may provide a light that provides a steady bright light to illuminate the subject continuously while images are being captured. These auxiliary light sources increase the amount of light falling on and reflected by the subject to improve the quality of images captured.

The amount of light falling on a subject may be termed illuminance, which is the total luminous flux incident on a surface, per unit area. It is a measure of the intensity of the incident light, wavelength-weighted by the luminosity function to correlate with human brightness perception. Similarly, luminous emittance is the luminous flux per unit area emitted from a surface. Illuminance and luminous emittance may be measured in lux. Thus, an auxiliary light source provides a level of luminous emittance to create a level of illuminance on a subject. A camera will require a minimum level of illuminance of the subject to produce an image of acceptable quality. If the subject illuminance is low, the SNR will be low and the image will appear grainy or snowy. It is desirable to provide a subject illuminance that results in a SNR that is above the level necessary to provide an image of acceptable quality.

Cameras with digital image sensors are increasingly being added to various mobile devices, such as mobile telephones, personal digital assistants (PDA), mobile computers, and the like. When a camera is added to a mobile device that provides functions in addition to capturing images, the image capture may be a secondary function. As such, it is desirable to minimize the cost and space required to provide the image capture function. It would be desirable to provide subject illumination to improve the quality of captured images without adding a dedicated light source for image capture to the mobile device.

SUMMARY

A device to capture an image includes a camera oriented to capture a first image of a subject and a display oriented to display a second image that is viewable by the subject. A backlight is coupled to the display to provide light that passes through the display toward the subject. An image processor is coupled to the camera and the backlight to adjust an amount of light provided by the backlight responsive to a quality of the first image. The light provided by the backlight may illuminate the subject and thereby improve the quality of the first image. The image processor may further adjust the amount of light provided by the backlight responsive to an ambient light level sensed by an ambient light sensor. The image processor may further adjust the second image to adjust an amount of light that passes through the display.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
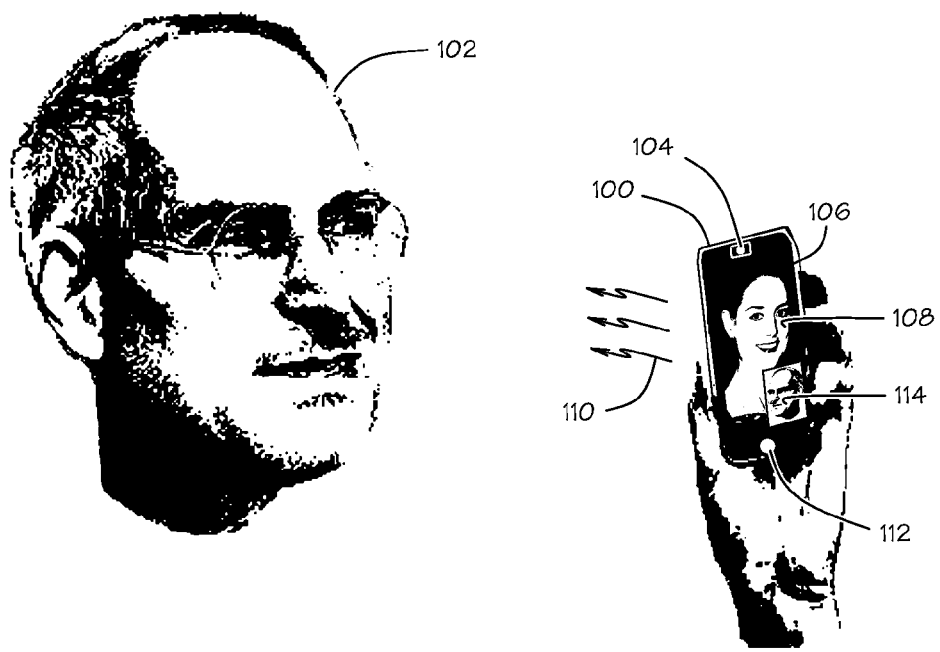
FIG. 1 shows a subject holding a device that embodies the invention.

FIG. 1 shows a subject 102 holding a device 100 that embodies the invention. The device 100 includes a camera 104 oriented to capture a first image of the subject 102. The device 100 further includes a display 106, such as a liquid crystal display (LCD), oriented to display a second image 108 that is viewable by the subject 102.

A device 100 that embodies the invention may be used for capturing an image of a subject 102 by orienting a camera 104 to capture a first image of the subject. The device 100 displays a second image 108 on a display 106 oriented to be viewable by the subject 102. The device 100 provides light 110 that passes through the display 106 toward the subject 102. The device 100 adjusts an amount of light 110 provided responsive to a quality of the first image. Thus the display 106 is used both to display an image 108 to the subject 102 and to illuminate the subject. The displayed image 108 is manipulated if necessary to increase the illuminance of the subject above the minimum level necessary for an acceptable image.

The device 100 may be a mobile telephone configured to capture audio in a speakerphone arrangement. The camera 104 and the display 106 may be used to transmit images of the parties to the telephone conversation to provide video conferencing. The display may include an image 108 of the called party and may further include an image of the calling party 114, which may be inset as a thumbnail image and may be presented as a mirror image.

Figure 2:
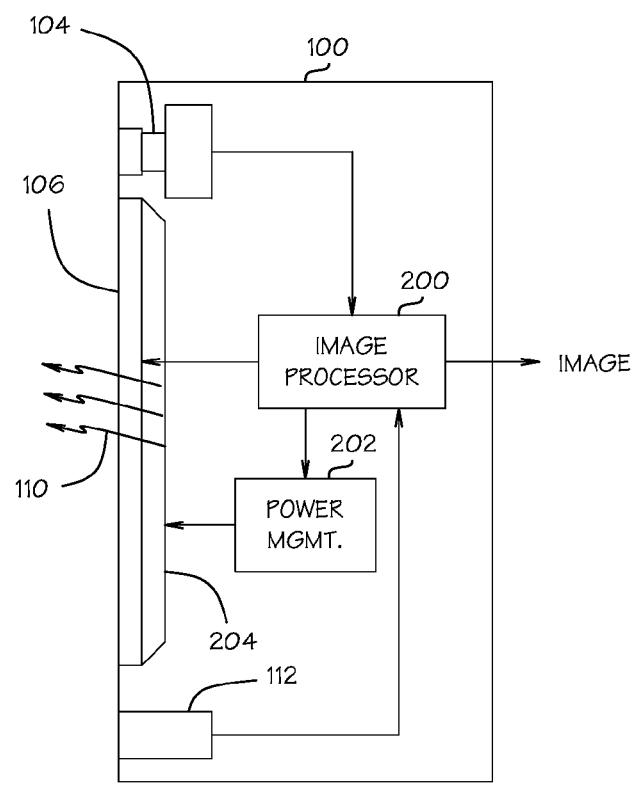
FIG. 2 shows a block diagram of the device shown in FIG. 1.

FIG. 2 shows a block diagram of the device 100 shown in FIG. 1. A backlight 204 is coupled to the display 106. The backlight 204 provides light 110 that passes through the display 106 toward the subject 102. An image processor 200 is coupled to the camera 104 and the backlight 204. The image processor 200 adjusts an amount of light 110 provided by the backlight 204 responsive to a quality of the first image. Adjusting the backlight 204 will change the luminous emittance of the display 106 and the illuminance of the subject 102. The backlight 204 is thus used to controllably illuminate the subject 102 to improve the quality of the captured first image.

In one embodiment, the image processor 200 is coupled to a power management module 202. The power management module is coupled to the backlight 204. The image processor 200 may adjust the amount of light provided by the backlight 204 by adjusting the amount of electric power provided to the backlight by the power management module 202.

The device 100 may further include an ambient light sensor 112 coupled to the image processor 200. The image processor may further adjust the amount of light 110 provided by the backlight 204 responsive to an ambient light level sensed by the ambient light sensor 112.

In one embodiment, the image processor 200 may increase the amount of light 110 provided by the backlight 204 in response to a low signal to noise ratio (SNR) in the first image.

In other embodiments, the image processor 200 may be coupled to the display 106. The image processor 200 may further adjust the second image 108 to adjust an amount of light 110 that passes through the display 106 responsive to a quality of the first image. Selectively adjusting the brightness of the second image 108 may control the level of illumination of the subject 102.

Figure 3A:
FIG. 3A shows an exemplary second image that may be shown on the device.
Figure 3B:
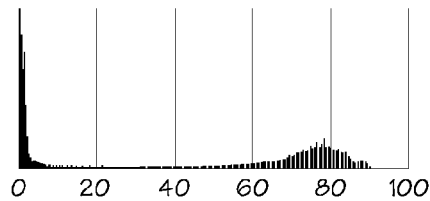
FIG. 3B shows a histogram of the brightness levels found in the exemplary second image shown in FIG. 3A.

FIG. 3A shows an exemplary second image 108 that may be shown on the display 106. FIG. 3B shows a histogram of the brightness levels found in the exemplary second image 108 shown in FIG. 3A.

Figure 4A:
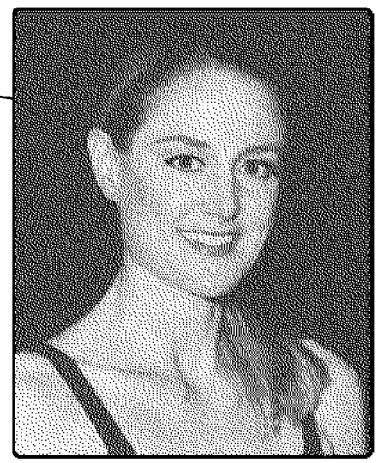
FIG. 4A shows the exemplary second image wherein the image brightness has been adjusted in a first way by the device.
Figure 4B:
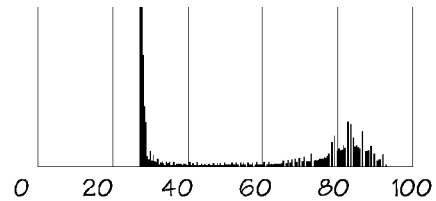
FIG. 4B shows a histogram of the brightness levels found in the exemplary second image shown in FIG. 4A.

FIG. 4A shows the exemplary second image 408 wherein the image processor 200 has adjusted the second image by increasing the brightness of dark areas to increase the amount of light 110 that passes through the display 106. FIG. 4B shows a histogram of the brightness levels found in the exemplary second image 408 shown in FIG. 4A. It may be observed that there are no areas of the image that have low brightness levels and that the range of brightness levels has been reduced. The image has reduced contrast and increased brightness. More light will pass through the dark areas of this image while the appearance of the brighter areas is comparatively unchanged. This will increase the luminous emittance of the display 106 and the illuminance of the subject 102.

Figure 5A:
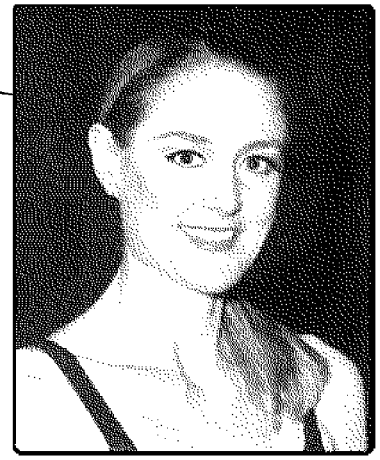
FIG. 5A shows the exemplary second image wherein the image brightness has been adjusted in a second way by the device.
Figure 5B:
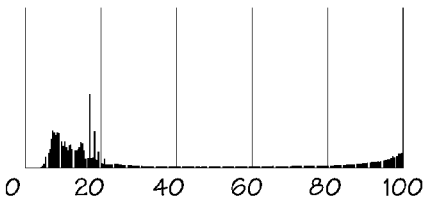
FIG. 5B shows a histogram of the brightness levels found in the exemplary second image shown in FIG. 5A.

FIG. 5A shows the exemplary second image 508 wherein the image processor 200 has adjusted the second image by increasing the brightness of light areas to increase the amount of light 110 that passes through the display 106. FIG. 5B shows a histogram of the brightness levels found in the exemplary second image 508 shown in FIG. 5A. It may be observed that the lightest areas of the image have little detail as the light areas have been pushed to be white or very light. The image has increased contrast and increased brightness with "blown out" highlights. More light will pass through the light areas of this image while the appearance of the darker areas is comparatively unchanged. This will increase the luminous emittance of the display 106 and the illuminance of the subject 102.

Figure 6A:
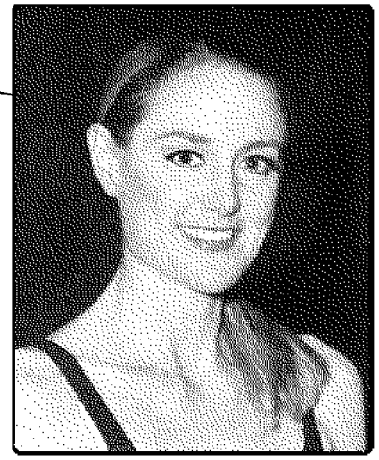
FIG. 6A shows the exemplary second image wherein the image brightness has been adjusted in a third way by the device.
Figure 6B:
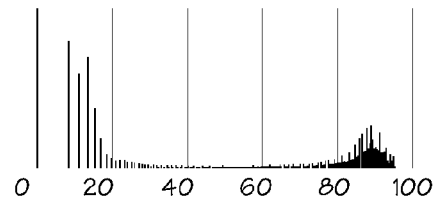
FIG. 6B shows a histogram of the brightness levels found in the exemplary second image shown in FIG. 6A.

FIG. 6A shows the exemplary second image 608 wherein the image processor 200 has adjusted the second image by increasing the brightness of both light and dark areas to increase the amount of light 110 that passes through the display 106. FIG. 6B shows a histogram of the brightness levels found in the exemplary second image 608 shown in FIG. 6A. It may be observed that the image retains much of the contrast and detail of the unadjusted image 108 as shown in FIG. 3A. The image has "stretched out" the darker areas and "compressed" the brighter areas to brighten the image while retaining close to the same range of brightnesses found in the unadjusted image 108. This may be described as increasing the gamma of the image. More light will pass through all but the lightest areas of this image while the appearance of the image remains comparatively natural. This will increase the luminous emittance of the display 106 and the illuminance of the subject 102.

It will be appreciated that the adjustments described above are exemplary and other adjustments may be made to the image to control the amount of light 110 from the backlight 204 that passes through the image 108, and thus the luminous emittance of the display 106. It will be further appreciated that the image processor 200 may also adjust the image 108 by decreasing the brightness of the image to decrease the amount of light 110 that passes through the display 106 if necessary to maintain the quality of the first image being captured by the camera 104.

The image processor 200 may further adjust a color balance of the second image 108 responsive to a white balance of the first image being captured by the camera 104. The may reduce color casts in the captured first image.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A method for capturing an image, the method comprising:
   orienting a camera including an image sensor to capture a first image of a subject;
   displaying a second image on a display oriented to be viewable by the subject;
   providing a steady light that passes through the display toward the subject to simultaneously and continuously illuminate both the second image and the subject;
   adjusting an amount of light provided responsive to a quality of the first image by adjusting the second image to adjust an amount of light that passes through the display;
   determining an ambient light level with an ambient light sensor;

adjusting the amount of light provided responsive to the ambient light level; and increasing a brightness of dark areas of the second image relative to the brightness of light areas to increase the amount of light that passes through the display responsive to a relatively low quality of the first image.

2. The method of claim 1, further comprising adjusting a color balance of the second image responsive to a white balance of the first image.

3. The method of claim 1, wherein adjusting an amount of light provided responsive to a quality of the first image further comprises adjusting an amount of electric power provided to the steady light.

\* \* \* \* \*